Feb. 26, 1929.
F. K. VIAL ET AL
1,703,127
WHEEL BREAKER
Filed Jan. 14, 1922
10 Sheets-Sheet 4
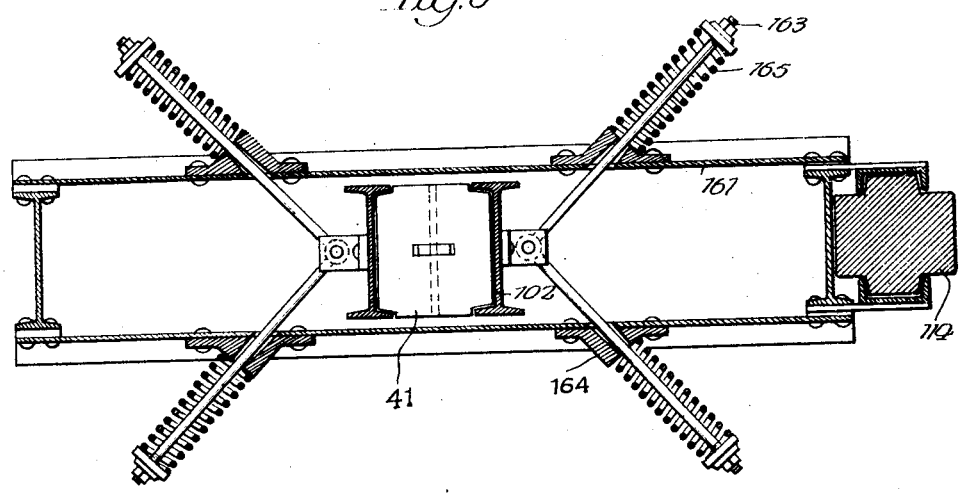
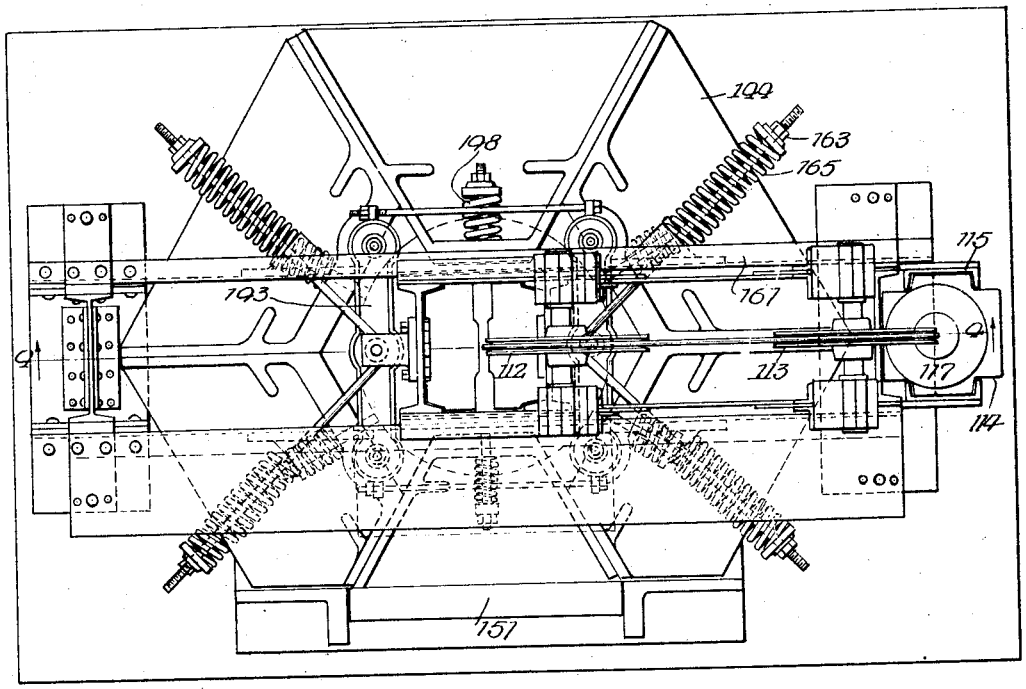
Inventors
Frederick K. Vial
David W. Starkey
By Munday, Clarke & Carpenter
Attys.

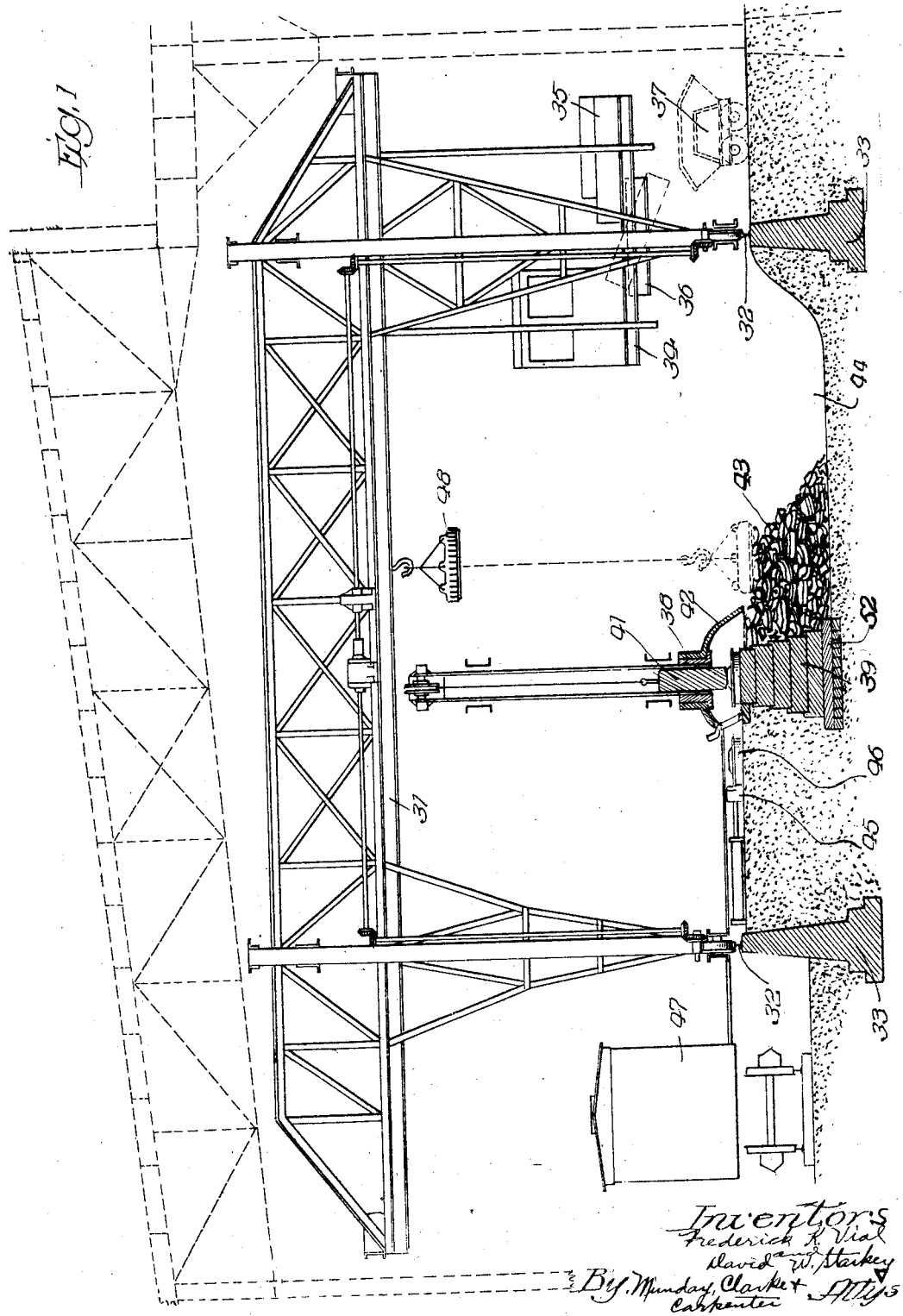

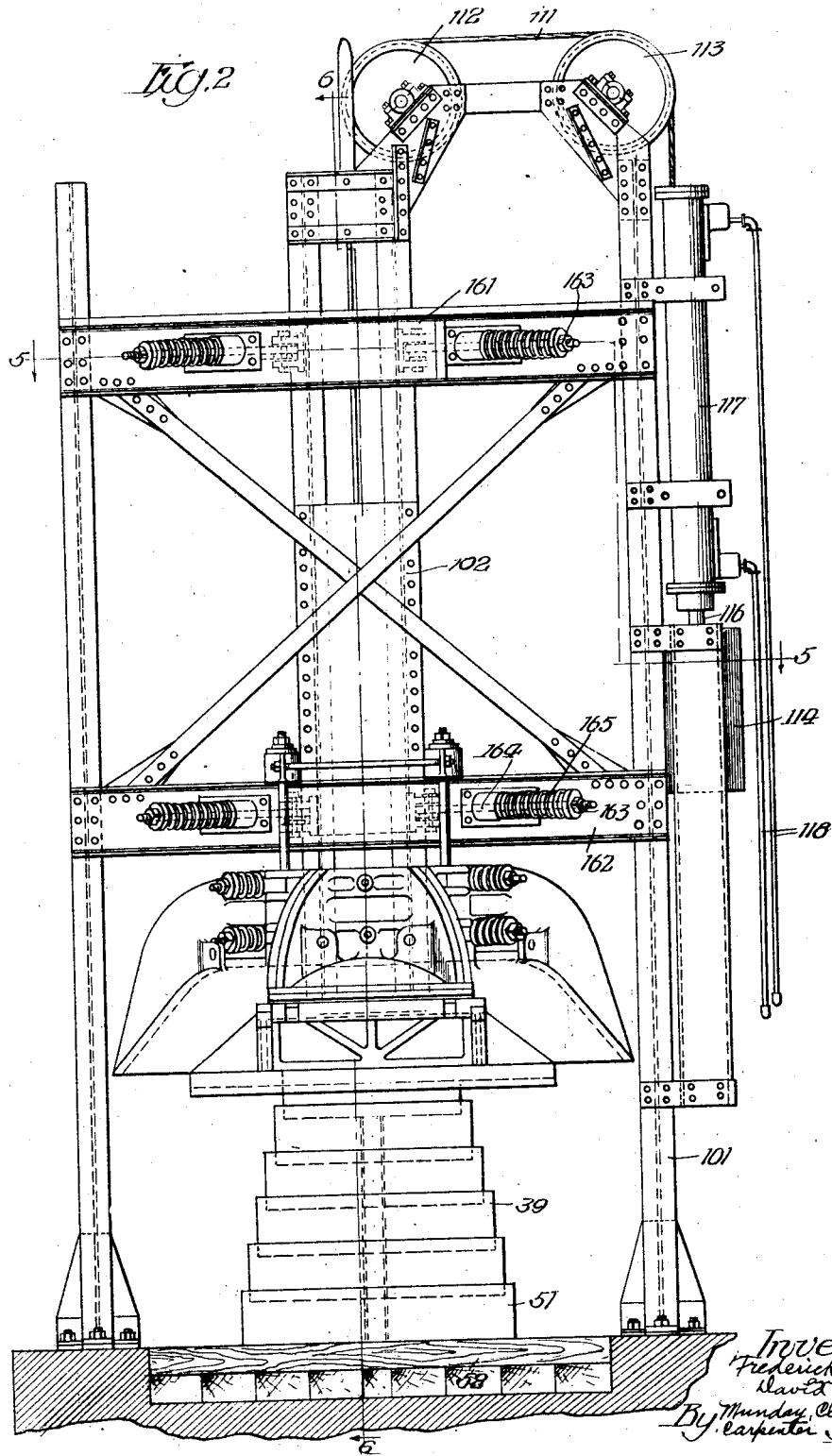

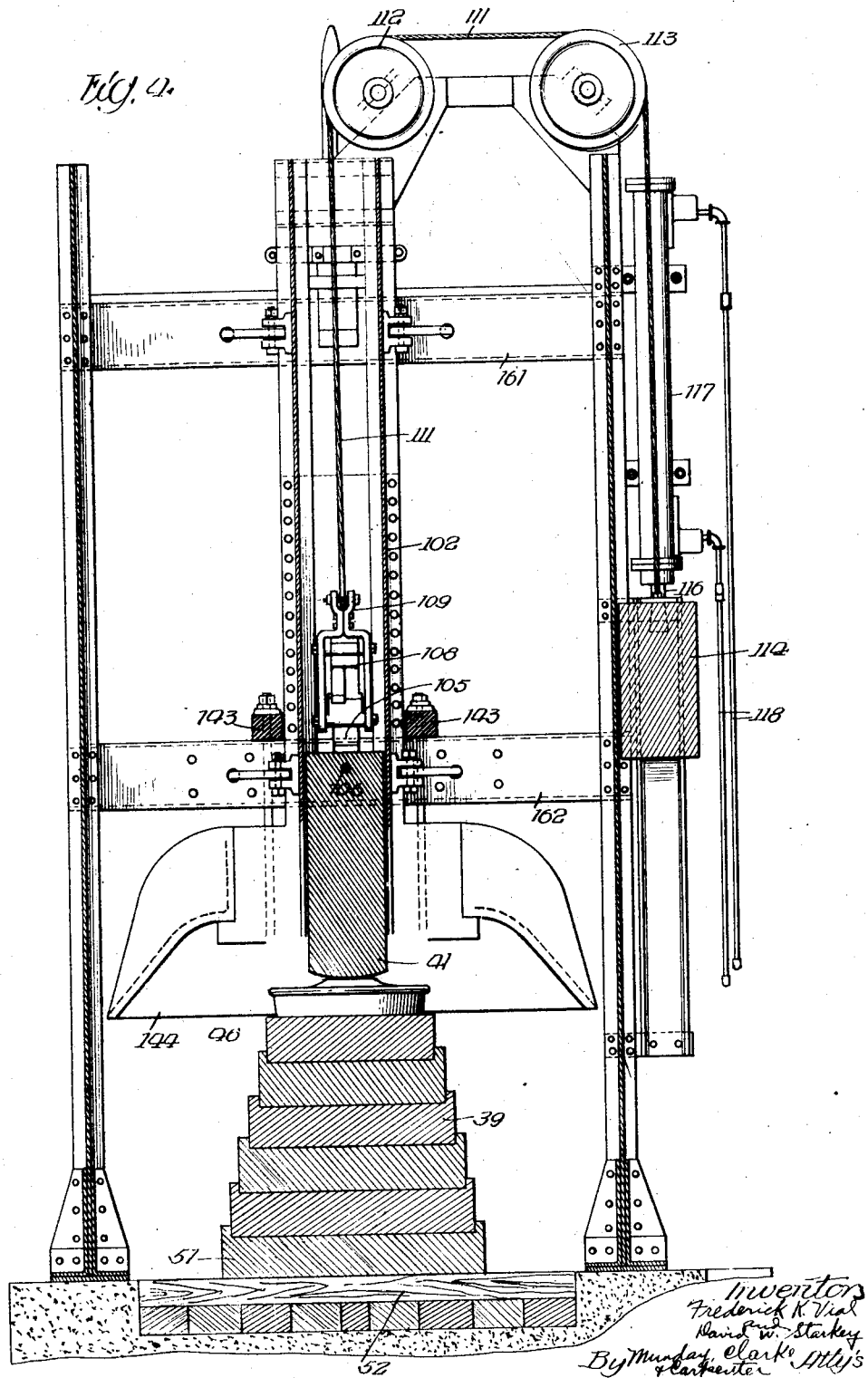

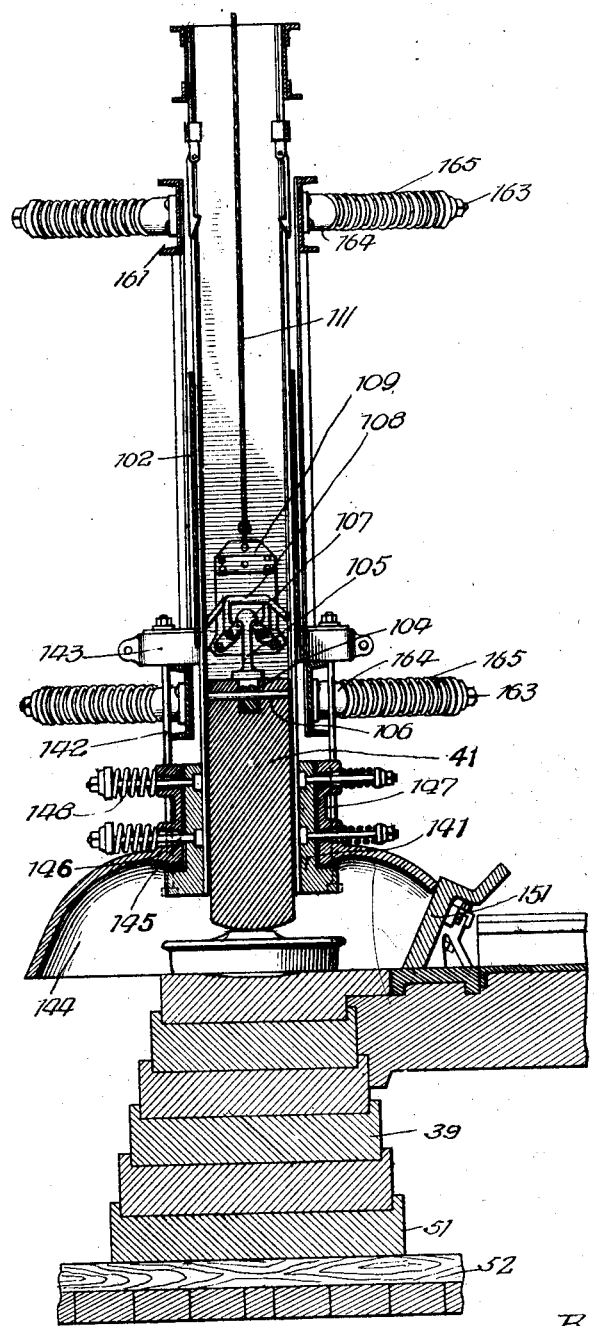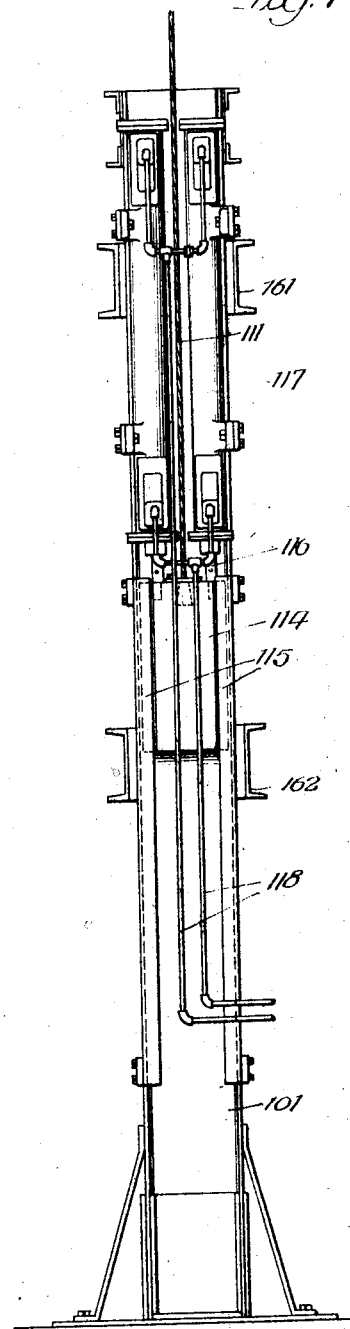

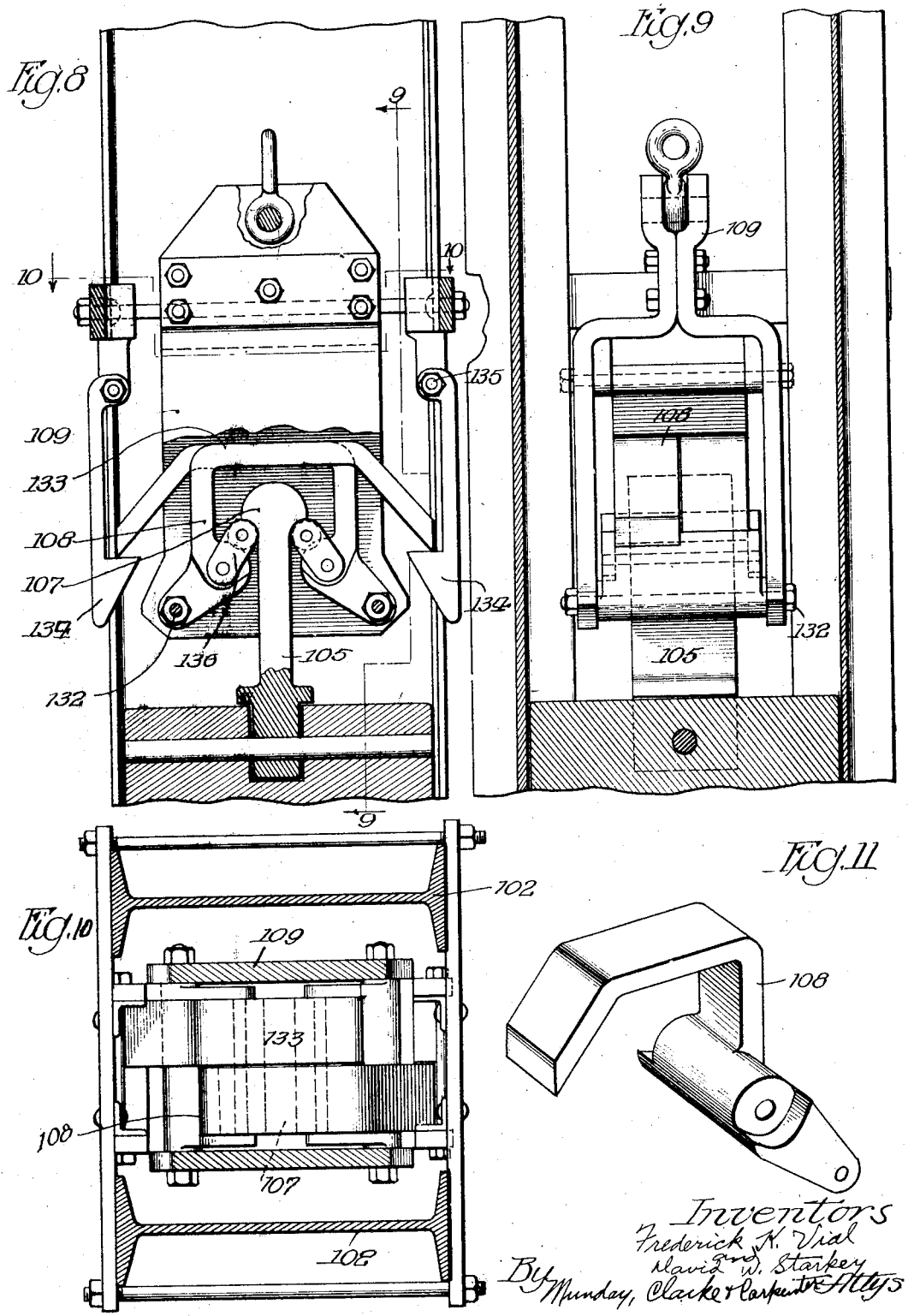

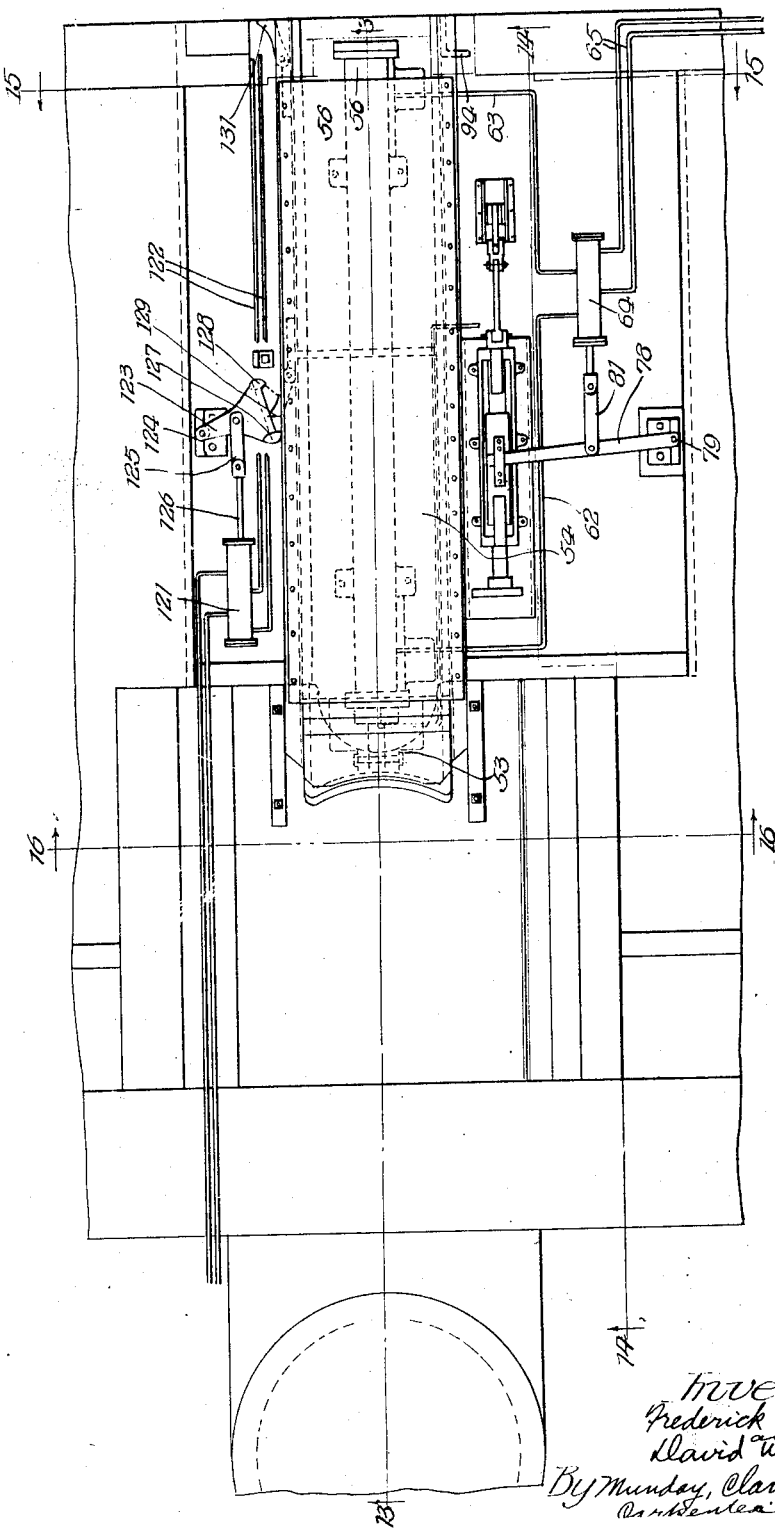

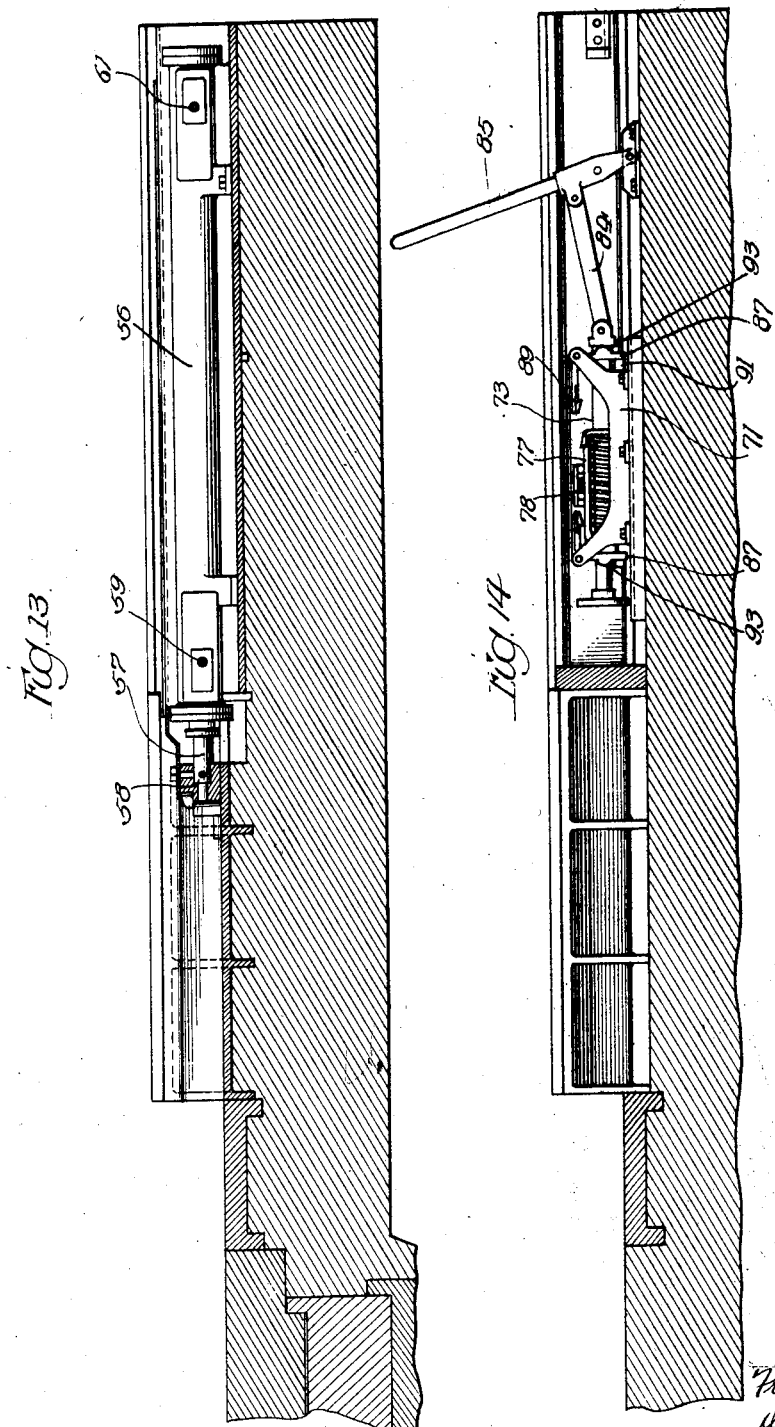

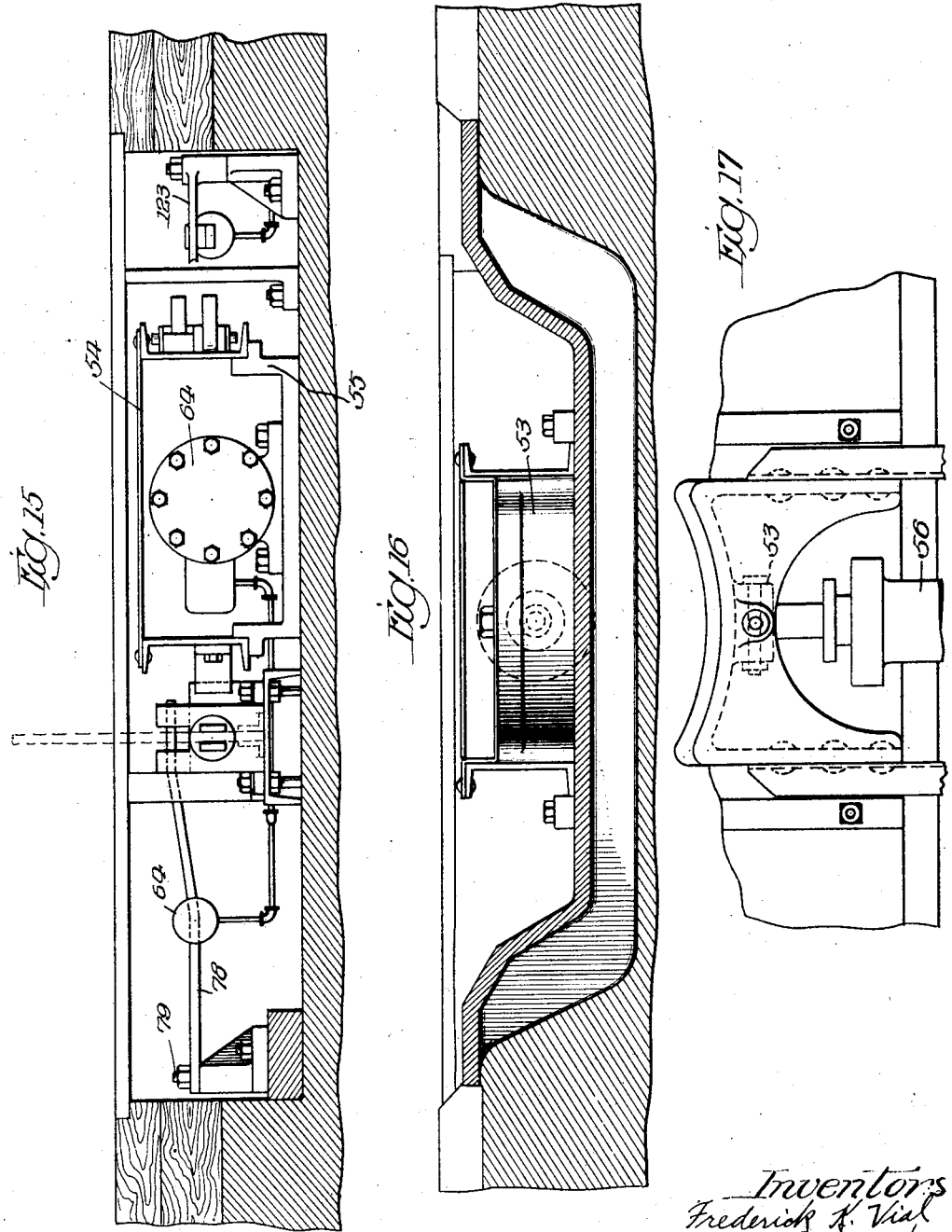

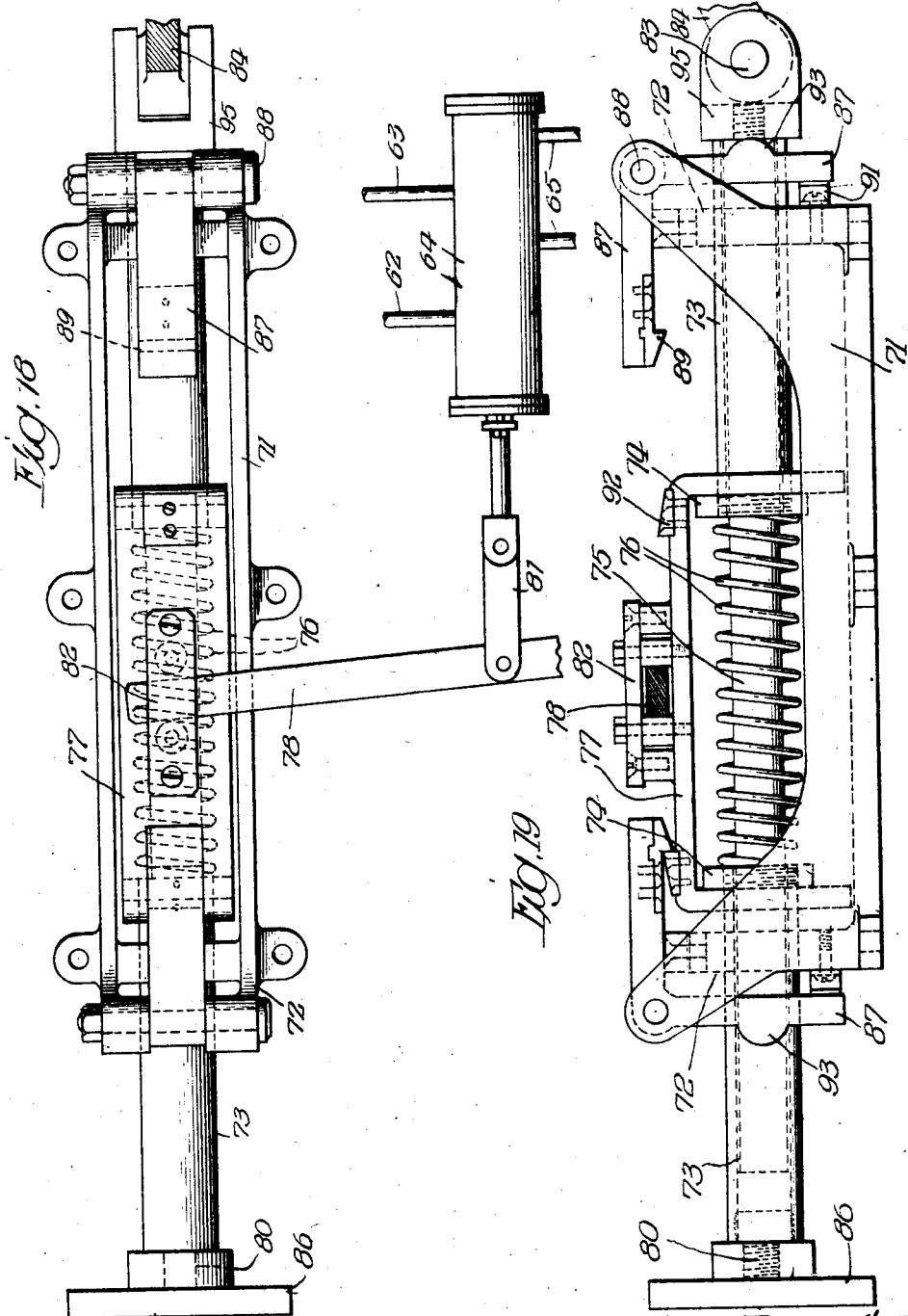

Patented Feb. 26, 1929.

1,703,127

UNITED STATES PATENT OFFICE.

FREDERICK K. VIAL AND DAVID W. STARKEY, OF CHICAGO, ILLINOIS, ASSIGNORS TO GRIFFIN WHEEL COMPANY, OF CHICAGO, ILLINOIS, A CORPORATION OF MASSACHUSETTS.

WHEEL BREAKER.

Application filed January 14, 1922. Serial No. 529,358.

This invention relates in general to breakers for scrap and waste iron in a foundry, and while the embodiment of it hereinafter described is particularly adapted for the breaking of car wheels, it will be readily manifest that this apparatus is capable of use for breaking other iron and steel members, and further that certain aspects of the invention have other and more general valuable use.

A principal object of this invention is the provision of an apparatus for breaking car wheels and the like which will greatly reduce the cost of this operation in foundry practice. In this regard our invention contemplates the rapid and substantially continuous action of the breaker with minimum attention by the operator. It contemplates improved means for feeding in the article to be broken, improved means for breaking it, and the provision of means for confining the broken parts to a single pile or location so that they need not be collected from a distributed area.

Another and highly important object of the invention is the provision of a breaker for wheels and the like, which will wholly or substantially wholly eliminate danger to the attendants from flying pieces and permit, by reason of the elimination of such flying pieces, the association therewith of apparatus of more or less delicate and destructible character.

While the foregoing are perhaps the two principal purposes of the invention it will be noted that there are a considerable number of other novel results, each of which it is desired to protect in the fullest manner possible and all of which are here asserted to be of importance considered alone and in connection with the general scheme. The several objects and advantages of the invention will be more fully apparent and appreciated as it is better understood from the following description, which, taken in connection with the accompanying drawings, discloses a preferred embodiment thereof.

Referring to the drawings,

Figure 1 is a schematic view of a foundry layout in which the invention is embodied;

Fig. 2 is a side elevation of the breaker proper;

Fig. 3 is a top plan view thereof;

Fig. 4 is a section taken substantially on the line 4—4 of Fig. 3;

Fig. 5 is a section taken substantially on the line 5—5 of Fig. 2;

Fig. 6 is a section taken substantially on the line 6—6 of Fig. 2;

Fig. 7 is a side elevation of the hydraulic operating mechanism for the breaker;

Fig. 8 is an enlarged side elevation of the impactor lift member;

Fig. 9 is a section taken substantially on the line 9—9 of Fig. 8;

Fig. 10 is a section taken substantially on the line 10—10 of Fig. 8;

Fig. 11 is an enlarged perspective view of one of the impactor lifting latches;

Fig. 12 is a top plan view of the means for positioning the article into breaking position;

Fig. 13 is a section taken substantially on the line 13—13 of Fig. 12;

Fig. 14 is a section taken substantially on the line 14—14 of Fig. 12;

Fig. 15 is a section taken substantially on the line 15—15 of Fig. 12;

Fig. 16 is a section taken substantially on the line 16—16 of Fig. 12;

Fig. 17 is an enlarged partial detail plan view of the pusher front;

Fig. 18 is an enlarged top plan view of the pusher valve control mechanism; and

Fig. 19 is a side elevation thereof.

Referring to the drawings, Fig. 1 shows a sectional view, somewhat schematically, through a foundry equipped with a wheel breaker constructed in accordance with my invention. Reference character 31 indicates a gantry crane mounted upon tracks 32, these tracks being supported on concrete abutments 33. The gantry crane carries a platform 34 having bins 35 for containing material to enter into the charges to the cupolas and is provided with a weighing tiltable platform 36 for charging cupola cars 37 to carry the charges to the cupolas.

The breaker proper is indicated at 38 and it will be noted that this comprises a support 39, an impactor 41 and fragment hood or deflector 42 adapted to confine the parts of the broken wheels or other articles to a pile 43. This pile is preferably formed in a pit 44 below the normal ground or floor level of this portion of the foundry. Associated with the impactor and support and forming from certain aspects of the invention a part of the wheel breaker is a feeding means 45 for feeding the car wheels 46 onto the support and under the impactor. The feeding means 45 is mounted upon a level with the top of the support 39 and these parts are arranged appropriately with respect to the floor or delivery level of a car 47 bringing the supply of wheels or other articles to be broken. The gantry crane has a lifting magnet 48 for picking up the fragments from the pile 43 and delivering them into the weighing platform 36 or into a bin 35 to be used in the mix charge to the cupola. The process is thus substantially continuous and capable of conduction by a minimum number of attendants.

The wheels or other articles are positioned upon the support 39, which in the present instance is constructed of a number of heavy members 51 placed one upon the other and all mounted upon a suitable base 52. The wheels are fed in from the side and the mechanism for accomplishing this will now be described, reference being had in this connection more particularly to Figs. 12 to 19 inclusive. A pusher head 53 is carried upon the forward end of a housing or body 54, which housing is mounted in guides 55. The wheel is adapted to be positioned manually or otherwise in front of the pusher head and the pusher then actuated to slide the wheel horizontally onto the support of the breaker. The pusher is caused to reciprocate by a fluid pressure cylinder 56 which is preferably hydraulic, having a piston rod or stem 57 connected at 58 to the rear side of the pusher head. This piston is caused to reciprocate from fluid pressure inlets 59 and 61 with which communicate pipes 62 and 63 leading from the common control valve 64 in turn connected with exhaust and pressure pipe 65. Since this valve may have any usual or preferred construction it is believed that particular description of it may be unnecessary.

This valve control is adapted to be started into operation for each feeding action by the operator and thereafter be automatically controlled until the pusher shall have positioned the wheel upon the support and returned to its retracted normal position.

The control for the valve 64 is shown in detail in Figs. 18 and 19 and schematically in Fig. 12. This control comprises a frame 71 having upright bearings 72 at each end through which are mounted sleeves 73. These sleeves may freely reciprocate in their bearings and each is provided at its inner end with a collar or enlargement 74. A rod 75 extends into the sleeve ends and across the space beneath them and is embraced by a spring 76 having bearing at each end against the enlargement 74 of the sleeves. A yoke 77 is provided to embrace the sleeves beyond the collars or enlargements 74 so that this yoke limits the separating movement of the sleeves under the action of the spring 76. A lever 78 pivoted at 79 at one end and connected intermediate its ends with the valve 64 by a link 81 is loosely engaged at 82 with the yoke 77 so that movement of the yoke, as will be presently described, will cause through the lever 79 and link 81 alteration of the valve position. Viewing Figs. 14 and 19 the right-hand end of the rod 75 is connected at 83 by a link 84 with a starting lever 85 and the other end of the rod is connected at 80 with an enlarged head 86. The frame 71 carries at each end a bell crank latch member 87 pivoted at 88 in the top of the frame and having a latching tooth 89 as may be seen in Fig. 19. A spring 91 normally moves the latch bell crank into latching position. Latch teeth 92 are mounted upon the top of the yoke 77 and are adapted to be engaged by one or the other of the latch teeth 89 of the bell cranks 87. When the lever 85 is pulled to the right (viewing Fig. 14) the rod 75 moves in the same direction and the head 86 moves with it. This movement causes accompanying movement of the sleeve 73 and the compression of the spring 76. The spring continues to be compressed until the head 86 engages a protuberance 93 on the left-hand bell crank 87 with the resultant release of the latch at this side. Release of this latch permits the spring to expand with the movement to the right of the yoke and a shifting of the valve to permit admission of fluid under pressure behind the advancing side of the cylinder 56. This causes movement of the pusher in its operating stroke and this movement continues until a lug 94 (Fig. 12) engages the head 86 of the rod 75. Upon release of the left-hand latch the movement of the yoke 77 carries it over and into engagement with the latch at the right. When the lug 94 engages the head 86 it causes accompanying movement of this head and of the rod 75 compressing the spring 76 by movement of the right-hand sleeve 73 as the lever 85 is moved over toward its starting position, the sleeve being engaged in this movement by a head 95 carrying the pivot 83. This head finally engages the right-hand latch bell crank and at the end of the desired stroke of the pusher releases the yoke and permits reversal of valve arrangement in valve 64. It might be mentioned that as shown on the drawings this valve is adapted to alternately establish the ends of the cylinder in communication with fluid under pressure and with the exhaust.

Referring now to Figs. 2 to 11 the breaking portion of the mechanism will be described. A frame 101 of any suitable and preferable structural material is provided and extends up above the support 39. This frame supports an enclosed guideway 102 for an impactor or heavy rectangular weight 41. This weight is adapted to be lifted to permit the insertion of a car wheel and dropped thereupon to break it. The weight consists in the present instance of a solid body recessed at 104 at its top to receive a lifter stem 105, a pin 106 being positioned through the body and through the stem to hold the parts together. This stem has an enlarged top or head 107 adapted for engagement by latches 108, which will be later described in detail and which are carried upon a lift body 109 suspended from a cable 111, which cable takes over sheaves 112 and 113 in the top of the frame. The cable then extends down into attachment to a weight 114 mounted between side guides 115 and fast at its ends to the stems 116 of plungers carried in cylinders 117. These cylinders are automatically actuated to produce actuation of the impactor in timed relation with the action of the pusher. Two fluid pressure pipes 118 lead to the cylinders from a control valve 121 and from this valve pipes 122 lead to a source of fluid pressure and to an exhaust. A lever 123 is pivotally mounted at 124 adjacent the travel of the pusher and is connected by a link 125 with the valve stem 126 of the valve 121. This lever is provided with two spaced operating lugs 127 and 128 adapted to be engaged by two pivoted latches 129 and 131 on the side of the pusher body. The latch 128 in the forward movement of the pusher engages lug 127 and opens the upper sides of the cylinders 117 to pressure. This results in the lifting of the impactor so that it is up when the pusher moves the car wheel or other article onto the support. As the pusher starts on its return movement, latch 131 engages lug 128 on lever 123 producing movement in the opposite direction to the cylinders with the resulting release of the impactor permitting it to fall upon the wheel or other article and break it.

Figs. 8 to 11 show in detail the connection between the impactor and the lifting mechanism and it will be noted that this connection comprises the two latches 108, each of which is pivoted at 132 on the lift body 109 and has a part 133 extending over and down into position to be engaged by a pivoted dog 134 depending from its pivot 135. Each latch member 108 carries a link 136 adapted to engage beneath the head 107 of the impactor stem, two such dogs 134 having a toggle grip on this head as the impactor is lifted. Upon the upward movement of the impactor the latches idly pass the dogs 134. When, however, the hydraulic cylinder starts a lowering movement the latches engage the dogs and are moved about their pivots to withdraw the links 136 from beneath the head 107 permitting the head to drop to break the wheel.

Means are provided for causing the fragments to fall into a pile and for preventing them flying about with resultant injury to attendants and to other pieces of apparatus. This means comprises a hood of yielding character and made up, in the present instance, of four sections. A body 141 is mounted in the frame, being suspended therefrom by bolts 142 engaging yoke members 143. The hood sections indicated by reference character 144 are carried by this body, being held thereon by bolts 145 engaged in the head and extending through relatively large openings 146 in a neck part 147 of the section. Springs 148 embrace the bolts beyond the sections and hold them yieldingly into deflecting position. In order that no fragments may fly back against the pusher or through the space made necessary in the sections to permit action of the pusher a pivoted gate 151 is provided and this gate is adapted to drop by gravity over the opening through which the wheel is inserted and to be elevated thereaway by the wheel under the action of the pusher. Yielding means are provided to hold the frame in position and permit slight sidewise movement as the impactor falls. The guide 102 is supported from two cross-constructions 161 and 162, the cross-pieces 162 being located just beneath and supporting the yoke members 143. The guides are carried in these cross-constructions upon pivoted rods 163 extending through angle bearings 164 upon the cross-pieces and carrying springs 165 at their outer ends, these springs being arranged four at each level as may be seen upon viewing Figs. 3 and 5. It will be noted that the entire operation after once being started by placing a wheel in front of the pusher and pulling back upon the starting lever is automatic throughout an entire cycle. That is to say until the pusher has placed a wheel upon the support causing lifting of the impactor as an incident thereto and has returned to its starting position with resulting dropping of the impactor and the breaking of the wheel.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. An apparatus for breaking wheels and the like, comprising a support, impacting means, means for delivering the article on said support and beneath said impacting means, and means interposed between said article delivery means and said support for preventing fragments engaging said article delivery means.

2. An apparatus for breaking wheels and the like, comprising a support, impacting means, means for delivering the article on said support and beneath said impacting means, and a pivoted member liftable by the wheel upon movement on to the support and returnable to a normal position thereafter for preventing fragments engaging said article delivery means.

3. In an apparatus for breaking car wheels and the like, the combination of a support for the wheel, an impactor, guides for the impactor, and means lifting said impactor and releasable therefrom upon initial downward movement of the impactor to permit said impactor to engage and break the wheel.

4. An apparatus for breaking car wheels and the like, comprising a support for the article, an impactor, and a vertically movable device automatically engaging said impactor when lowered into contact therewith to lift the same and permit its release upon initial downward movement from a height above an article on said support to permit fracture by impact with the falling impactor.

5. An apparatus for breaking car wheels and the like, comprising a support for the article, an impactor, and a clamping device automatically engaging said impactor when lowered into contact therewith to lift the same and permit its release upon initial downward movement from a height above an article on said support to permit fracture by impact with the falling impactor.

6. An apparatus for breaking car wheels and the like, comprising a support for the article, an impactor, and a reciprocating device automatically engaging said impactor upon starting an upward stroke of its reciprocation, and automatically releasing said impactor upon starting a downward stroke.

7. In an apparatus for the breaking of car wheels and the like, in combination, a support for the article, an impactor, a lifting device for said impactor, said lifting device having jaws engaging said impactor to lift the same, and means whereby said jaws are released by the initial portion of the lowering movement of said device.

8. In an apparatus for breaking car wheels and the like, in combination, a support for the article, an impactor, a lifting device for said impactor, said lifting device having jaws engaging said impactor to lift the same, and means arranged alongside the path of movement of said jaws for disengaging same from said impactor during initial downward movement of the latter.

9. An apparatus for breaking car wheels and the like, comprising a support for the car wheel, an impactor, a power actuated means for positioning an article upon said support and beneath said impactor, said power actuated means being manually started into action and having a complete reciprocation in each actuation.

10. An apparatus for breaking car wheels and the like, comprising a support for the article, an impactor and means whereby said impactor is automatically operated by the positioning of said article upon said support.

11. An apparatus for breaking car wheels and the like, comprising a support for the article, an impactor, fluid pressure means for elevating said impactor and releasing it to permit breaking of the article, means for positioning an article upon said support, and a control for said fluid pressure means in turn controlled by movement of said article positioning means.

12. An apparatus for breaking car wheels and the like, comprising a support, breaking mechanism co-operating with said support, fluid pressure means actuating said breaking mechanism, a pusher for positioning said articles upon said support, and fluid pressure means actuating said pusher, the breaking fluid pressure means being actuated from the pusher.

13. A pusher control for a wheel breaking apparatus and the like, comprising fluid pressure means, and a control valve for the same, and a valve operating mechanism including a bar manually moving in one direction and automatically movable in the opposite direction, each said movement during its initial action compressing a spring subsequently released in said action to shift said valve.

14. A pusher control for a wheel breaking apparatus and the like, comprising fluid pressure means, and a control valve for the same, and a valve operating means including a bar, a rider mounted thereon, a spring in said rider, a latch holding said rider against initial movement in each direction with resulting compression of the spring, said latch being subsequently released to permit movement of the rider to shift the valve.

15. An apparatus for breaking car wheels and the like, comprising an impactor adapted to be dropped upon the article and having a part for engagement by a lifter, a lifter having latches adapted to engage said part to cause it to be elevated upon upward movement of the lifter, and pivoted detents for engaging said latches to release them at a predetermined point in the travel of said lifter with said impactor.

16. An apparatus for breaking car wheels and the like, comprising an impactor adapted to be dropped upon the article and having a part for engagement by a lifter, a lifter having latches adapted to engage said part to cause it to be elevated upon upward movement of the lifter, and detents adapted to engage under said latches upon the initial downward movement of said lifter to release the latches and permit the impactor to fall.

17. The combination of a gantry crane, a breaker for car wheels and the like mounted within the scope of action of said crane, said breaker having means for confining the fragments of the article broken to a zone preventing damage to said crane and attendants operating it.

18. The combination of a gantry crane having a storage and weighing platform, and a lifting magnet, and a breaker for car wheels and other articles having means for depositing the fragments resulting from breakage within the zone of action of the magnet of said crane.

19. The combination of means for moving a car wheel or other article laterally, a support for said article, said support and said means being disposed substantially on a level with the floor of a freight car from which the wheels may be delivered, and a pit adjacent said support for receiving the fragments of said article.

FREDERICK K. VIAL.
DAVID W. STARKEY